United States Patent [19]
Harris et al.

[11] Patent Number: 5,603,819
[45] Date of Patent: Feb. 18, 1997

[54] VARIATION OF THE SHAPE AND MORPHOLOGICAL PROPERTIES OF SILICA AND METAL OXIDE POWDERS BY ELECTRO HOMOGENEOUS PRECIPITATION

[75] Inventors: Michael T. Harris, Knoxville; Osman A. Basaran; Warren G. Sisson, both of Oak Ridge; Ronald R. Brunson, Lenoir City, all of Tenn.

[73] Assignee: Martin Marietta Energy Systems, Inc., Oak Ridge, Tenn.

[21] Appl. No.: 257,423

[22] Filed: Jun. 9, 1994

Related U.S. Application Data

[63] Continuation-in-part of Ser. No. 35,441, Mar. 24, 1993, abandoned.

[51] Int. Cl.[6] ............................................. C25B 1/24
[52] U.S. Cl. ........................... 205/341; 205/508; 205/538
[58] Field of Search .............................. 204/59 R, 157.51, 204/95; 423/592, 593; 205/341, 508, 538, 539, 543, 544, 545

[56] References Cited

FOREIGN PATENT DOCUMENTS
0308703  8/1991  Japan.

Primary Examiner—Kathryn Gorgos
Assistant Examiner—Brendan Mee
Attorney, Agent, or Firm—Bruce E. Harang; Shelley L. Stafford; Harold W. Adams

[57] ABSTRACT

The present invention provides a method for preparing irreversible linear aggregates (fibrils) of metal oxide powders by utilizing static or pulsed DC electrical fields across a relatively non-conducting liquid solvent in which organo-metal compounds or silicon alkoxides have been dissolved. The electric field is applied to the relatively non-conducting solution throughout the particle formation and growth process promoting the formation of either linear aggregates (fibrils) or spherical shaped particles as desired. Thus the present invention provides a physical method for altering the size, shape and porosity of precursor hydrous metal oxide or hydrous silicon oxide powders for the development of advanced ceramics with improved strength and insulating capacity.

19 Claims, 3 Drawing Sheets

VARIATION OF THE SHAPE AND MORPHOLOGICAL PROPERTIES OF SILICA AND METAL OXIDE POWDERS BY ELECTRO HOMOGENEOUS PRECIPITATION

The United States Government has rights in this invention pursuant to contract no. DE-AC05-84OR21400 between the United States Department of Energy and Martin Marietta Energy Systems, Inc., and funded by the Office of Basic Energy Sciences.

This is a continuation-in-part of applicants parent application U.S. Ser. No. 08/035,441, filed Mar. 24, 1993, now abandoned.

BACKGROUND OF THE INVENTION

1. Field of the Invention

The present invention relates to methods and apparatus for forming metal oxide powders. More particularly the invention relates to methods and apparatus for forming metal oxide powders utilizing electric fields to alter their size, shape and porosity.

2. Description of the Related Art

The development of new ceramic materials is sometimes hindered by the inability to reproducibly synthesize high quality starting powders. The ability to control the solid morphology and shape of materials formed from powers is largely dependent upon controlling particle size and size distribution and upon minimizing particle particle interaction. Small particles with a narrow range of particle size distribution are generally desired. Alternatively, a good distribution of particle sizes may include relatively large particles which form the bulk of the material as well as smaller particles used for filling the interstitial spaces between the larger particles during manufacture.

A number of methods have been developed to form monodisperse powders (i.e., particles with a narrow range of particle size distribution and low tendency toward agglomeration) by chemical methods such as the controlled homogeneous precipitation of metal oxides from metal alkoxide by hydrolysis in organic liquid systems. An example of this type of process is U.S. Pat. No. 4,755,369 issued Jul. 5, 1988 to Yoshiharu. U.S. Pat. No. 5,143,711 issued Sep. 1, 1992 to Kluge et al. discloses a process of chemical precipitation of metal-oxy compounds with subsequent thermal treatment. U.S. Pat. No. 5,149,682 issued Sep. 22, 1992 to Spencer et al. teaches the coprecipitation of metal oxides for use in preparing super conducting ceramics. These methods prove to be quite good at producing high purity metal oxide powders. In many cases, however, the conditions which are favorable for silicon and metal alkoxide hydrolysis and the subsequent silicon oxide and metal oxide precipitation are not amenable to minimizing particle-particle interactions and consequently, the powders form agglomerates and become polydispersed. It is sometimes advantageous to control aggregation of particles to produce aggregates with different shapes, sizes and morphologies. This can be done by imposing an electric field on the reacting solution. Other attempts to produce monodispersed metal oxide powders using the technique of metal alkoxide hydrolysis have involved the use of mechanical stirrers to disperse the aqueous phase in the organic liquid system. These techniques are energy intensive and generally do not produce metal oxide powders with the desired size distribution.

Other non-electrolytic methods include spray drying of bauxite clays to produce microspheres as taught in U.S. Pat. No. 5,175,133 issued Dec. 29, 1992 to Smith et al., and metal coating of ceramic powder particles by chemical absorption taught in U.S. Pat. No. 5,102,592 issued Apr. 7, 1992 to McCauley et al.

Electrolytic processes for producing metal oxide powders include the electrodeposition of a metal oxide film on an electrically charged plate using a constant current as taught in U.S. Pat. No. 4,818,352 issued Apr. 4, 1989 to Inaba et al., and precipitation of metal particles using a constant DC current and a constant pH as taught in U.S. Pat. No. 4,670,114 issued Jun. 2, 1987 to Beer et al., for example.

U.S. Pat. No. 5,112,433 issued May 12, 1992 to Dawson et al. teaches the formation of perovskite particles using an electrolytic solution and a controlled pH. U.S. Pat. No. 5,166,130 issued Nov. 24, 1992 to Enomoto et al. teaches the production of an electrically conductive ceramic film wire. Whereas U.S. Pat. No. 4,810,339 issued Mar. 7, 1989 to Heavens et al. teaches a slurry of metal oxide powders layered onto a substrate using electrophoretic deposition.

U.S. Pat. No. 5,122,360 issued Jun. 16, 1992 to Harris et al. teaches a method of preparing metal oxide powder wherein a first solution which is substantially organic has delivered into it as drops a second solution substantially immiscible in the first solution. The drops of the second solution are atomized by a pulsed electric field forming "micro-drops" of the second solution. Reagents in the first solution diffuse into and react with reactants in the micro-drops of the second solution forming metal hydroxide or oxalate particles which are then recovered. This reference teaches the criticality of utilizing solution having two liquid phases whereas the present invention utilizes only a single phase liquid solution.

OBJECTS AND SUMMARY OF THE INVENTION

One object of the present invention is to provide a method for tailoring the shape of silicon oxide and metal oxide particles within a desired range of size distribution by imposing an external (i.e., electric field) on a reacting solution of alkoxides.

It is a further object of the present invention to provide a method and apparatus for altering the morphology and/or porosity of the particles for use as ceramic precursors.

Another object of the present invention is to produce silicon oxides and metal oxides having a desired range of size distribution in a substantially non-electrolytic solution.

Accordingly, one form of the present invention relates to a method of preparing metal oxide powders comprising the steps of: preparing a relatively non-conducting liquid comprising an organic liquid containing small amounts of hydroxide ions, and at least one silicon alkoxide or organometal complex; producing a static or pulsed electrical field; applying said static or pulsed electrical field to said relatively non-conducting reacting liquid solution, thereby forming silicon oxide or hydrous metal oxide particles with desired shapes.

Another form of the present invention relates to a method of preparing irreversible linear aggregates (fibrils) of metal oxide powders comprising the steps of: preparing a relatively non-conducting homogeneous liquid comprising an organic solvent liquid containing a low concentration of water and hydroxide ions, and at least one compound selected from the group comprising silicon alkoxides and organometal compounds; producing an electrical field; applying said electrical field across said relatively non-conducting liquid, thereby inducing the formation of linear aggregates (fibrils) of silicon hydroxide or metal hydroxide; converting said desired silicon hydroxide or metal hydroxide linear aggregates (fibrils) to silicon oxide or metal oxide linear aggregates (fibrils).

Still another form of the present invention relates to a method of preparing irreversible spherical particle metal oxide powders comprising the steps of: preparing a relatively non-conducting homogeneous liquid comprising an organic solvent liquid containing a low concentration of water and hydroxide ions, and at least one compound selected from the group comprising silicon alkoxides and organometal compounds; producing a pulsed electrical field having a desired frequency; applying said pulsed electrical field across said relatively non-conducting liquid, thereby inducing the formation of spherical shaped particles of silicon hydroxide or metal hydroxide; converting said desired silicon hydroxide or metal hydroxide spherical shaped particles to silicon oxide or metal spherical shaped particles.

Yet another form of the invention relates a providing a physical method for altering the size, shape and porosity of precursor hydrous metal oxide or hydrous silicon oxide powders for the development of advanced ceramics with improved strength and insulating capacity.

Preferred forms of the invention, as well as other embodiments, objects, features and advantages of this invention, will be apparent from the following detailed description which is to be read in connection with the accompanying drawings.

DESCRIPTION OF THE PREFERRED EMBODIMENTS OF THE INVENTION

Figure 1:
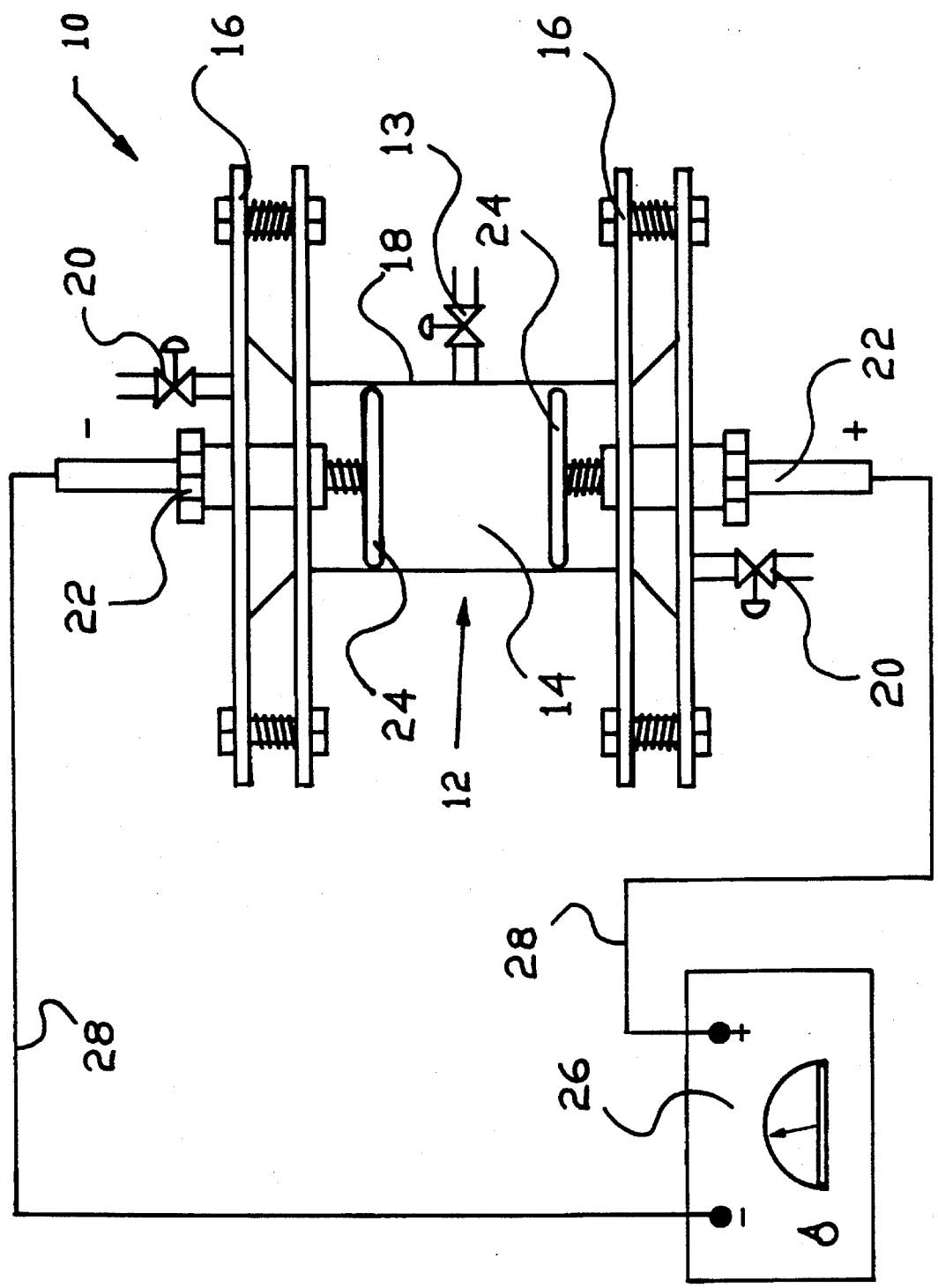
FIG. 1 shows a schematic view of one embodiment of the apparatus of the present invention.

The present invention will be better understood from the specification taken in conjunction with the accompanying drawings in which like reference numerals refer to like parts and the following definitions.

Referring now to FIG. 1 there is shown an embodiment of an apparatus 10 for producing hydrous metal oxide powder in accordance with the present invention. The depicted apparatus 10 generally comprises a reaction vessel 12, having a value 13 containing a relatively non-conducting liquid phase 14. The reaction vessel 12 may be of any number of shapes but in one embodiment the reaction vessel 12 is an open cylinder with end closures 16 on each end of side wall 18. End closures 16 each having a valve 20 for introduction and removal of materials and further each having an electrode assembly 22 passing therethrough and an electrode 24 thereby located inside each end of reaction vessel 12 and in intimate contact with relatively non-conducting liquid 14. Electrodes 24 are electrically connected to a power source 26 through electrode assemblies 22 via connecting wires 28. The relatively non-conducting liquid phase 14 is introduced into reaction vessel 12 through either one of valves 20 or valve 13.

By relatively non-conducting liquid phase is meant a liquid phase containing a silicon alkoxide or an organometal complex in a substantially non-conducting organic liquid solvent and also including water and/or ammonia. In practice the concentration of water is in the range of from about $0.1 < [H_2O] \leq 6M$, preferably about 3M, and the concentration of ammonia is in the range of from about $0.1 < [H_2O] \leq 0.7M$, preferably about 0.3M. A preferred substantially non-conducting organic liquid solvent also includes a combination of water in a concentration of from about 0.1 mol/L to about 2 mol/L, and ammonia in a concentration of from about 0.0 mol/L to about 0.7 mol/L.

Suitable relatively non-conducting organic liquids include derivatives of straight chain and branched chain alcohols, such as tert-amyl alcohol. Suitable relatively non-conducting organic liquids are further characterized as having low dielectric constants and relatively high volatility. Most preferably having dielectric constants ($\epsilon$) of less than 10 and boiling points of from about 50° C. to about 100° C.

Metals used in the present invention are in the form of liquid organo-metal compounds such as for example liquid metal alkoxides. These liquid metal alkoxides may be suitably produced from a metal chosen from the group consisting of transition metals, alkali and alkaline earth metals, lanthanides and actinides; and an alkoxide chosen from the group consisting of derivatives of straight chain and branched chain alcohols. Silicon alkoxides comprising silicon and an alkoxide chosen form the group consisting of derivatives of straight chain and branched chain alcohols is also suitable for use in the present invention. Examples of suitable liquid silicon alkoxide and organo-metal compounds include, for example, tetraethylorthosilicate, titanium ethoxide, aluminum sec-butoxide, aluminum butoxide stearate, zirconium butoxide and tetraethylorthosilicate.

The concentration of silicon alkoxide or organo-metal compound in the non-conducting organic liquid suitably is from about 0.1M to 1.0M, and preferably from about 0.2M. A presently preferred alkoxide concentration is from about 0.1 mol/L to about 1.0 mol/L.

While not prescribing to any one theory, it is thought that initially there is a hydrolysis reaction as shown in reaction (1). The silicon or metal is designated by "M" and has a valence n.

$$M(OR)_n + nH_2O \rightarrow M(OH)_n(\text{ppt.}) + nROH \quad (1)$$

In the instance of a silicon alkoxide or metal alkoxide organo-metal compound, the silicon alkoxide or metal alkoxide is converted in the presence of water into a silica or metal hydroxide with the alkoxide coming off as alcohol, ROH. The hydrous silica or metal hydroxide particles then precipitate out of the solution. The metal hydroxide, M(OH)n, is then collected and dehydrated in a dryer according to reaction (2) forming the silicon or metal oxide.

$$M(OH)_n \rightarrow MO_{n/2} + (n/2)(H_2O) \quad (2)$$

The silicon or metal oxide powders produced by this method exhibit ultrafine particle size, generally in the range of from about 0.02 to about 1.0 micrometer. Additionally, other specific physical characteristics, such as porosity and shape, can also be produced as desired.

During a typical electro-homogeneous precipitation operation, a relatively non-conducting liquid phase 14 is introduced into the reaction vessel 12 through valve 13 and/or one or more of valves 20. A static or pulsed voltage supplied by current source 26 is applied to electrodes 24 such that the electric field generated between the electrodes 24 is greater than about 1 kilovolts per centimeter, and has a pulse rate of from about 100 Hz to about 8,000 Hz. Under these conditions reaction (1) above and in some cases, takes place producing silicon hydroxide or metal hydroxide ultrafine particles which precipitate out of solution in the form of linear aggregates, or spherical particles, depending on the pulse rate (frequency) under the electric field. These ultrafine silicon hydroxide and metal hydroxide particles are removed from reaction vessel 12 and dehydrated by a drying means and through reaction (2) above the ultrafine silicon oxide or metal oxide powder of the present invention is produced. This ultrafine silicon oxide or metal oxide powder consists of linear aggregates, fibrils, other shapes which depend on the nature of the external electric field, or mixtures thereof.

The shape of the resulting particles can be either linear aggregate or spherical as desired by the selection of the pulse rate (frequency) of the electric field. Lower frequencies promote the formation of linear aggregates while higher frequencies promote the formation of spherical particles. Frequencies in the range of from about 100 Hz to about 2500 Hz promote the formation of linear aggregates whereas frequencies in the range from >2500 Hz to about 8000 Hz promote the formation of spherical particles.

Likewise the porosity of the resulting powders can be controlled through the present invention. Since the particles in the powders are formed by the aggregation of smaller nuclei, oligomers and polymers, a pulsed electric field can be used to control the shape of aggregates during the precipitation and aggregation process. Thus, the final particle is comprised of a mixture of linear aggregates and spherical particles. The porosity is controlled by varying the pulsing frequency of the electric field, the electric field strength and time in which the reacting mixture is exposed to the electric field. Each of these parameters will vary the relative amounts of linear aggregates and spherical particles that are in the final particle. The porosity of the final particles varies depending on the relative amounts of linear aggregates and spherical particles present. Particular reaction parameters to achieve a desired porosity may be ascertained by one skilled in the art without undue experimentation.

EXAMPLE 1

This example shows the electro-homogeneous precipitation using a constant DC power source. It will be seen that the silicon oxide produced is one containing large amounts of ultrafine linear aggregates.

Figure 2:
FIG. 2 shows a photograph of a metal oxide powder produced using a static DC electrical field.

Tetraethylorthosilicate (TEOS) 0.2M, 2.0M water and 0.22M ammonia in tert-amyl alcohol were introduced into the reaction vessel and a static DC current of 2000 kV/cm was applied to the electrodes. The resulting precipitate was dried, removed from the reaction vessel, dried at ~100° C. and the resulting silicon oxide powder was photographed using a Joel model T scanning electron microscope with an accelerator voltage of 30 KV and 5000× magnification and the resulting photograph (FIG. 2) clearly shows the irreversible linear aggregates formed during the electro-homogeneous precipitation.

EXAMPLE 2

Figure 3:
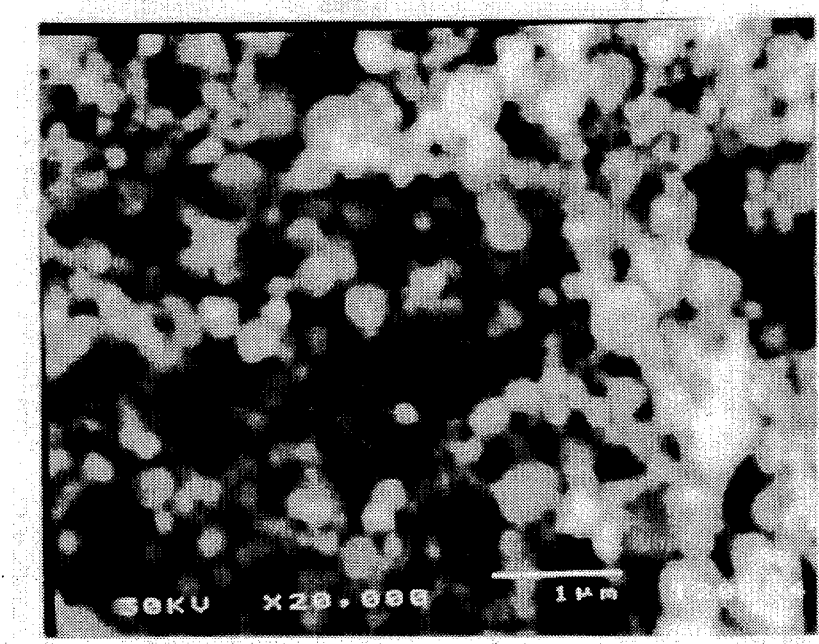
FIG. 3 shows a photograph of a metal oxide powder of the present invention produced using a pulsed DC electrical field.

A solution exactly as used in Example 1 was introduced into the reaction vessel and a pulsed DC current of 1800 Hz and 17 kV spikes was applied to the electrodes. The resulting precipitate was dried, removed from the reaction vessel, dried at ~100° C. and the resulting silicon oxide powder was photographed using a Joel model T scanning electron microscope with an accelerator voltage of 30 DV and 5000× magnification and the resulting photograph (FIG. 3) clearly shows the ultrafine particles substantially without the formation of irreversible linear aggregates.

Although the illustrative embodiments of the present invention have been described herein with reference to the accompanying drawings it is to be understood that the invention is not limited to those precise embodiments, and that various other changes and modifications may be effected therein by one skilled in the art without departing form the scope or spirit of the invention.

What is claimed is:

1. A method of preparing irreversible linear aggregates of metal oxide powders comprising the steps of:
   (a) preparing a relatively non-conducting homogeneous liquid comprising an organic solvent liquid having a dielectric constant ($\epsilon$) of less than 10 and a boiling point of from about 50° C. to about 100° C., containing water in a concentration of from about 0.1 mol/L to about 6.0 mol/L, and ammonia in a concentration of from about 0.1 mol/L to about 0.7 mol/L, and at least one compound selected from the group comprising silicon alkoxides and organometal compounds;
   (b) producing an electrical field;
   (c) applying said electrical field across said relatively non-conducting liquid, thereby inducing the formation of linear aggregates of silicon hydroxide or metal hydroxide;
   (d) converting said desired silicon hydroxide or metal hydroxide linear aggregates to silicon oxide or metal oxide linear aggregates.

2. A method as claimed in claim 1 wherein, said organic solvent liquid is selected from the group consisting of straight chain alcohols and branched chain alcohols, characterized as having low dielectric constants and relatively high volatility.

3. A method as claimed in claim 1 wherein, said organic solvent liquid is tert-amyl alcohol.

4. A method as claimed in claim 1 wherein, said electric field is a static electric field.

5. A method as claimed in claim 1 wherein, said electric field is a pulsed electric field.

6. A method as claimed in claim 1 wherein, said electric field is a static DC electrical field of greater than 1 kV/cm.

7. A method as claimed in claim 1 wherein, said electric field is a pulsed DC electrical field of from about 15 kV/cm to about 40 kV/cm and having a pulse rate of from about 100 Hz to about 8000 Hz.

8. A method as claimed in claim 1 wherein, said organometal compound is a metal alkoxide comprising:
   (a) a metal chosen from the group consisting of transition metals, alkali metals, alkaline earth metals, lanthanides and actinides; and
   (b) an alkoxide chosen from the group consisting of derivatives of straight chain alcohols and branched alcohols.

9. A method as claimed in claim 8 wherein, said alkoxide comprises straight chain alcohols having more than two carbons in the chain, and branched chain alcohols having more than two carbons in the chain.

10. A method as claimed in claim 1 wherein, said silicon alkoxide is tetraethylorthosilicate dissolved in the organic solvent liquid.

11. A method as claimed in claim 1 wherein, said relatively non-conducting liquid is further characterized as comprising:

(a) water in a concentration of from about 0.1 mol/L to about 2 mol/L;

(b) ammonia in a concentration of from about 0.0 mol/L to about 0.7 mol/L; and further characterized in that the alkoxide concentration is from about 0.1 mol/L to about 1 mol/L.

12. A method of preparing irreversible linear aggregates of metal oxide powders comprising the steps of:

(a) preparing a relatively non-conducting homogeneous liquid comprising an organic solvent liquid having a dielectric constant ($\epsilon$) of less than 10 and a boiling point of from about 50° to about 100° C., containing water in a concentration of from about 0.1 mol/L to about 6.0 mol/L, and ammonia in a concentration of from about 0.1 mol/L to about 0.7 mol/L, and at least one compound selected from the group comprising silicon alkoxides and organometal compounds;

(b) producing a pulsed electrical field having a desired frequency;

(c) applying said pulsed electrical field across said relatively non-conducting liquid, thereby inducing the formation of linear aggregates of silicon hydroxide or metal hydroxide;

(d) converting said desired silicon hydroxide or metal hydroxide linear aggregates to silicon oxide or metal oxide linear aggregates.

13. A method as claimed in claim 12 wherein, said organic solvent liquid is selected from the group consisting of straight chain alcohols and branched chain alcohols, characterized as having low dielectric constants and relatively high volatility.

14. A method as claimed in claim 2 wherein, said organic solvent liquid is tert-amyl alcohol.

15. A method as claimed in claim 2 wherein, said electric field is a pulsed DC electrical field of from about 15 kV/cm to about 40 kV/cm and having a pulse rate of from about 100 Hz to about 8000 Hz.

16. A method as claimed in claim 2 wherein, said organometal compound is a metal alkoxide comprising:

(a) a metal chosen from the group consisting of transition metals, alkali metals, alkaline earth metals, lanthanides and actinides; and (b) an alkoxide chosen from the group consisting of derivatives of straight chain alcohols and branched alcohols.

17. A method as claimed in claim 16 wherein, said alkoxide comprises straight chain alcohols having more than two carbons in the chain, and branched chain alcohols having more than two carbons in the chain.

18. A method as claimed in claim 2 wherein, said silicon alkoxide is tetraethylorthosilicate dissolved in the organic solvent liquid.

19. A method as claimed in claim 12 wherein, said relatively non-conducting liquid is further characterized as comprising:

(a) water in a concentration of from about 0.1 mol/L to about 2 mol/L;

(b) ammonia in a concentration of from about 0.0 mol/L to about 0.7 mol/L; and further characterized in that the alkoxide concentration is from about 0.1 mol/L to about 1 mol/L.

* * * * *